United States Patent [19]
Wiles et al.

[11] 3,734,757
[45] May 22, 1973

[54] THIOCARBOHYDRAZONE FUNGICIDES

[75] Inventors: David M. Wiles; Tony Suprunchuk, both of Ottawa, Ontario, Canada

[73] Assignee: Canadian Patents and Development Limited, Ottawa, Ontario, Canada

[22] Filed: Aug. 7, 1970

[21] Appl. No.: 62,131

[52] U.S. Cl. .................106/186, 424/27, 424/267, 424/275, 424/285, 424/323
[51] Int. Cl. ......A01n 9/12, A01n 17/12, C08b 29/00
[58] Field of Search.....................424/267, 275, 285, 424/323, 27; 260/552 SC; 106/186

[56] References Cited

FOREIGN PATENTS OR APPLICATIONS 754,756  8/1956  Great Britain
676,192  12/1963  Canada

OTHER PUBLICATIONS

Guha et al., Quart. J. Indian Chem. Soc. 2, 225–239 (1925).
Stephen et al., J. Chem. Soc., 2531–2538 (1926).
Sandstrom, I, Acta Chem. Scand., 14, 1037–1042 (1960).
Sandstrom, II, Acta Chem. Scand., 17, 1595–1598 (1963).
Wiles et al., I, J. Med. Chem. 12, 526–527 (1969).
Benns et al., Appl. Microbiol. 8, 353–356 (1960).
Wiles et al., II, Can. J. Chem. 45, 1735–1743 (1967).
Wiles et al., III, J. Med. Chem. 13, 323–324 (1970).

Primary Examiner—Stanley J. Friedman
Assistant Examiner—Allen J. Robinson
Attorney—James E. Armstrong and Ronald S. Cornell

[57] ABSTRACT

A fungicidal composition, method of application and protected articles are described where the active fungicide (or fungistatic compound) is a mono- or dithiocarbohydrazone which may be prepared by condensation of thiocarbohydrazide with an aldehyde or ketone.

7 Claims, No Drawings

THIOCARBOHYDRAZONE FUNGICIDES

The present invention relates to fungicidal compositions and to a method of treating cellulosic materials in order to inhibit or prevent attack by various micro-organisms. More particularly the invention relates to fungicidal compositions which comprise the condensation produce of an aldehyde or a ketone with thiocarbohydrazide as the active ingredient.

Micro-organisms, such as fungi and bacteria, are known to metabolize a wide variety of materials. Thus, for example, certain micro-organisms are known to metabolize cellulosic materials and thus to attack such articles as fabrics, cordage, rope and paper products which contain cellulosic fibers. Thus, cotton, viscose rayon, jute, hemp and linen yarns and fabrics may be made rotten very rapidly by micro-organisms upon exposure to them under conditions which favor their growth, i.e., relatively moist, warm, still-air conditions. Such conditions are to be found in the tropics at most times of the year and in many other places during the summer months. They are also to be found indoors in centrally heated establishments throughout the world. This type of attack by micro-organisms is quite clearly disadvantageous and it is known to prevent or inhibit the growth of micro-organisms which metabolize cellulose by the treatment of cellulosic materials with relatively low molecular weight compounds which are toxic towards cellulolytic micro-organisms. Existing treatments, however, suffer from various disadvantages, for example with regard to cost, length of inhibition, toxicity to humans or deleterious effects on the substrate. Thus pentachlorophenol and pentachlorophenyl laurate compounds have been used against cellulolytic micro-organisms but such compounds hydrolyze relatively easily and thehydrolysis products which result, in addition to being toxic to humans, degrade cellulose fibers. Possibly the most effective of the compounds toxic to cellylolytic micro-organsims is copper 8-hydroxyquinolinolate, which is also known as "copper-8," and this compound is highly fungistatic at low concentrations but it is unstable to light so that exposure to sunshine of a substrate treated with copper-8 causes the compound to dissociate, become ineffective, and release metallic copper. This gives rise to copper stains which may adversely affect the appearance of the treated substrate and also can result in unwanted degradative side effects, particularly when rubber is present.

It has now been found that the condensation products of aldehydes and ketones with thiocarbohydrazide are highly effective in inhibiting or preventing the growth of cellulolytic micro-organisms. In accordance with the invention therefore there are provided fungicidal compositions which comprise, as active ingredient, a mono- or di- thiocarbohydrazone obtained by the condensation of thiocarbohydrazide with an aldehyde or a ketone.

The active ingredient of the fungicidal compositions of the invention may be represented by the following general formula:

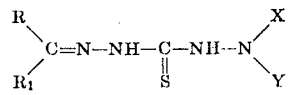

in which the group

represents the residue of an aldehyde or ketone of the formula

and X and Y separately represent hydrogen atoms or taken together represent the group

Preferably each of R and $R_1$, which may be the same or different, represents a hydrogen atom or an alkyl, alkenyl, aryl, aralkyl, aralkenyl or heterocyclic group. R and $R_1$ taken together may also represent a divalent group derived from a cyclic ketone

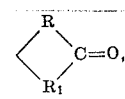

such as cyclopentanone or cyclohexanone in which R and $R_1$ together represent tetramethylene and pentamethylene respectively.

Such compounds may be divided into the two groups of mono-thiocarbohydrazones and dithiocarbohydrazones: in the first group only one of the terminal amino groups has been condensed with a ketone or aldehyde so that the symbols X and Y both represent hydrogen atoms, whereas in the second group both of the terminal amino groups have reacted with a ketone or aldehyde so that the symbols X and Y taken together represent a group

The general method by which such thiocarbohydrazone compounds may be prepared involves a condensation type reaction between a ketone or an aldehyde and thiocarbohydrazide

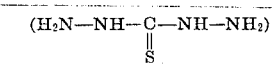

In a typical reaction a few drops of glacial acetic acid are added to the mixture of reactants, which is then heated on a steam bath for a suitable period of time, say from 5 minutes to about 1 hour, desirably about half an hour. Such a reaction is generally carried out in a mixture of water and a common organic solvent, such as for example, methanol or ethanol. The choice of solvent will depend upon the particular aldehyde or ketone being used in the condensation reaction and can be readily made by a person skilled in the art.

In cases where a dithiocarbohydrazone is to be prepared we have found that acceptable yields of the product are best achieved by conducting the condensation in a reaction medium formed by excess amounts of liquid aldehyde or ketone reagent. If only a twice molar excess of ketone or aldehyde over the thiocarbohydrazide is used an intractable mixture of mono- and di-substituted derivatives is obtained.

The nature of the aldehyde or ketone to be used in the condensation reaction is not critical and a wide variety of such compounds may be used. Thus, for example, there may be used aliphatic aldehydes and ketones, both saturated and unsaturated, aromatic compounds such as aryl aldehydes, aralkyl aldehydes, diaryl ketones and alkyl and aryl ketones, heterocylic aldehydes and ketones, and aldehydes and ketones containing more than one aldehydic or ketonic group. Preferred compounds which are used are saturated and unsaturated aliphatic aldehydes of from one to 20, especially of from five to 12 carbon atoms such as formaldehyde, acetaldehyde, valeraldehyde, hexanal, heptanal, octanal, nonanal, decanal, undecanal dodecanal, octadecenal and 9-undecenal. Simple aromatic aldehydes which can be used include benzaldehyde and its substituted derivatives such as m-nitrobenzaldehyde, 2,4-dichlorobenzaldehyde, anisaldehyde, o-chlorobenzaldehyde, o-dimethylaminobenzaldehyde, o-hydroxybenzaldehyde, cumaldehyde, veratraldehyde, piperanal and resorcylaldehyde. However, aromatic aldehydes which can also be used include aralkyl aldehydes such as phenylacetaldehyde and aralkenyl aldehydes such as cinnamaldehyde. Heterocyclic aldehydes which may be used include furfural and 2-thiophenaldehyde. Ketones which may be used include aliphatic ketones such as acetone, di-isopropylketone, methyl ethyl ketone, cyclopentanone, 2-octanone, and 2-heptadecanone, mixed aliphatic and aromatic ketones such as acetophenone, and aromatic ketones such as benzophenone.

It is not necessary to separate the condensation reaction production from the reaction mixture, since the impure mixture of reaction products which may be obtained as a result of both mono-condensation and di-condensation reactions taking place simultaneously exhibits good fungicidal activity. The mono- or di- thiocarbohydrazones are not soluble in water but may suitably be used in the form of a dispersion or emulsion in water in the treatment of the articles to be protected against attack. Solutions in common organic solvents, such as methanol, ethanol, or dioxane may be used as may mixtures of the active ingredients with an inert liquid or solid carrier. Solutions or dispersions of the active ingredient preferably comprise from 2 to 10 percent by weight of the active ingredients. Preferably the treatment step is effected in the presence of a surfactant or wetting agent, which may be either anionic, cationic, or non-ionic, to aid in the penetration by the active ingredient of the article being treated. Examples of suitable surfactants include such anionic surfactants as dioctyl sodium sulfosuccinate, sulfated fatty esters, oleic acid ester of sodium isethionate and sodium oleyl p-anisidine sulfonate, such non-ionic surfactants as polyoxyethylene laurate, alkylaryl polyether condensates, linear aliphatic ethoxylates, ethylene oxide condensates such as nonyl phenol ethylene oxide condensate and trimethyl nonyl polyethylene glycol ether, and such cationic surfactants as primary coco amine ethoxylate, cetyltrimethyl-ammonium bromide, methyl polyethanol quarternary amine and

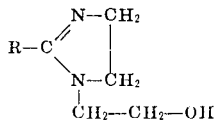

(where R is oleyl). Preferred amounts of surfactant are in the range 0.5 to 2 percent by weight of the fungicidal composition.

The compositions of the present invention may be applied to the articles to be treated by any of the available techniques, for example by dipping, padding or spraying. Good penetration of the active ingredient throughout the article being treated is clearly desirable and for this reason the use of a liquid carrier is preferred. Treatment preferably is effected in such a way that the proportion of active ingredient present in the treated article is in the range of 1 to 10 percent, especially 2 to 5 percent, by weight based on the weight of the untreated article.

The fungicidal activity of the compositions of the present invention may be tested in accordance with techniques well known in the art. Thus, for example, inhibition of the growth of *Chaetomium globosum* may be evaluated by the tube-dilution procedure described in Applied Microbiology, November 1960, page 353. In accordance with this test it has been found that mono- or di-thiocarbohydrazones prevent the growth of the micro-organism in a nutrient medium over a 2 week incubation period at fungicide concentrations as low as 10 parts per million. The performance of the fungicidal ingredients of the compositions of the present invention at such low concentrations is believed to equal the performance of any known fungicide and the compounds are stable to both heat and light. Additional tests which may be carried out in order to demonstrate the fungicidal activity of the compositions of the present invention include the fabric disc test, also described in Applied Microbiology, November 1960, at pages 353 and 354, and the soil burial test, carried out in accordance with Canadian Government Specifications Board Method 28.3 (4–GP–2) of Oct. 1, 1959.

In accordance with these tests it has been found that the compounds of the present invention are highly active against not only *C. globosum* but also against a variety of other micro-organisms including *Aspergillus niger*. While this latter micro-organism attacks cellulose only relative slowly it is particularly resistant to many fungicides. Fungicidal activity against *A. niger* is therefore considered to be demonstrative of a high degree of utility.

The invention will now be illustrated in more detail by reference to the following examples, in which parts and percentages are by weight unless otherwise specified.

EXAMPLE 1

Preparation of Mono 9-Undecenal Thiocarbohydrazone

To a solution of thiocarbohydrazide (0.0472 mole, 5.0g) in boiling water (75 ml) was added a solution of 9-undecenal (0.0944 mole, 14.9g) in ethanol (50 ml). The reaction mixture was heated gently on a steam bath for 15 minutes and then cooled. The white solid which formed was separated by filtration, washed with 50 percent ethanol/water mixture and dried. The yield of fungistatic component was 91 percent.

Repeated recrystallization from ethanol yielded a pure product having a melting point 161° C.

Analysis; calculated for $C_{12}H_{24}N_4S$, C, 56.25; H, 9.37; N, 21.87; S, 12.50.

Found: C, 56.27; H, 9.46; N, 21.80; S, 11.99

Example 1 above describes a typical condensation reaction between an aldehyde and thiocarbohydrazide. By substituting different aldehydes or ketones for the 9-undecenal utilized in Example 1 it is possible to prepare various of the fungistatic thiocarbohydrazones to be utilized in accordance with the present invention. While purification is described in this example it is not essential.

EXAMPLE 2

This example provides the results of tube-dilution evaluations of various mono- and di- thiocarbohydrazones.

The evaluations were made utilizing *Chaetomium globosum* strain USDA 1042.4 and *Aspergillus niger* strain USDA strain 215–5373.16. The organisms were inoculated into a nutrient medium of the following composition:

| | |
|---|---|
| Glucose | 5g |
| Ammonium nitrate | 3g |
| Dipotassium hydrogen phosphate | 2g |
| Potassium dihydrogen phosphate | 2.5g |
| Magnesium sulphate heptahydrate | 2g |
| Yeast extract | 5g |
| Distilled water | 1000 ml |
| pH | 6.3 |

The compound whose fungistatic properties were to be evaluated was suspended or dissolved in a suitable organic liquid, 0.1 ml of the solution or suspension being added to 5 ml of the liquid nutrient medium, in a 50- by 15-mm test tube.

After inoculation and incubation in the nutrient medium at 30°±2° C. for a suitable length of time, the presence or absence of growth was noted. All tests were carried out in duplicate. The criterion chosen to indicate antifungal activity was absence of growth of *C. globosum* in the presence of a concentration of 1,000 ppm of thiocarbohydrazone. Compounds showing activity as thus defined were examined at lower concentrations of 100 ppm and 10 ppm against *C. globosum* and at all three concentrations against *A. niger*.

To preclude the possibility that the organic liquid used may itself be responsible for inhibition, a blank experiment with no compound present was run, in which the amount of solvent present was the same as when a compound was being tested. In no case was there any evidence of inhibition.

The results of the tests were as summarized in Table I. In this Table the symbol "—" indicates a lack of growth for the microorganism, while the symbol "+" indicates that growth of the microorganism took place.

Discs of 8-ounce unbleached cotton duck, 1 in. in diameter, were saturated with a solution of the compound in p-dioxane and allowed to dry at room temperature. The amount or concentration of the fungicidal compound on the treated fabric was controlled either by varying the concentration of the solution or by changing the number of separate applications of solution. The treated discs were then placed on malt agar plates which had been streaked with spores of *A. niger* or *C. globosum*. Plates were incubated at 30°±2° C. for a suitable period of time after which the treated discs were examined for evidence of microorganism growth.

Tests were also carried out with solutions of the di(2-octanone) thiocarbohydrazone in dioxane containing the wetting agent dioctyl sodium sulfosuccinate.

The results of the tests were as summarized in Table II:

TABLE II

| Concentration of fungicide, % | Concentration of wetting agent, % | Behavior with *A. niger* | Behavior with *C. globosum* |
|---|---|---|---|
| 1.1 | | heavy growth on discs | medium growth on discs |
| 2.1 | | heavy growth on discs | light growth on edges of discs |
| 10.0 | | no growth on discs; no zone* | no growth on discs; 1/16" zone |
| 13.0 | | no growth on discs; no zone | no growth on discs; small zone |
| 20.0 | | no growth on discs; no zone | no growth on discs; no zone |
| 3.0 | | no growth on discs; zone | no growth on discs; large zone |
| 11.5 | 11.5 | no growth on discs; small zone | very large zone |
| | 6 | growth on discs | no growth on discs |

* zone of inhibition extending out from perimeter of fabric disc.

TABLE I

| Compound -thiocarbohydrazone | Chaetomium globosum | | | | | | Aspergillus niger | | | | | |
|---|---|---|---|---|---|---|---|---|---|---|---|---|
| | 1,000 p.p.m. | | 100 p.p.m. | | 10 p.p.m. | | 1,000 p.p.m. | | 100 p.p.m. | | 10 p.p.m. | |
| | 1 week | 2 weeks | 1 week | 2 weeks | 1 week | 2 weeks | 24 hrs. | 48 hrs. | 24 hrs. | 48 hrs. | 24 hrs. | 48 hrs. |
| Mono (octanal)- | — | — | — | — | — | — | + | + | + | + | + | + |
| Mono (nonanal)- | — | — | — | — | — | — | + | + | — | + | + | + |
| Mono (heptanal)- | — | — | — | — | — | — | + | + | + | + | + | + |
| Di (decanal)- | — | — | — | — | — | — | — | + | + | + | + | + |
| Di (undecanal)- | — | — | — | — | — | — | — | — | + | + | + | + |
| Di (dodecanal)- | — | — | — | — | — | — | + | + | + | + | + | + |
| Mono (methyl ethyl ketone)- | — | — | — | — | — | — | — | — | — | + | + | + |
| Di (2-octanone)- | — | — | — | — | — | — | — | — | — | + | + | — |
| Di (2-heptadecanone)- | — | — | — | — | — | — | — | — | — | + | + | + |
| Di (m-nitro benzaldehyde)- | — | — | — | — | — | — | — | + | + | — | + | + |
| Di (2,4-dichlorobenzaldehyde)- | — | — | — | — | — | — | | | | | | |

EXAMPLE 3

The effectiveness of the compound di(2-octanone) thiocarbohydrazone was evaluated by the plate-disc method. In this method the nutrient medium in which the microorganisms were incubated was a malt extract agar which had the following composition:

| | |
|---|---|
| Malt extract | 30g. |
| Yeast extract | 5g. |
| Agar | 20 g. |
| Distilled water | 1000 ml. |

EXAMPLE 4

The effectiveness of the compound di(2-octanone) thiocarbohydrazone was further evaluated by the soil burial test in accordance with the procedure of Canadian Government Specification Board Method 28.3 (4–GP–2) of Oct. 1, 1959. In this test the compound was applied to a cotton fabric as a solution in dioxane in the presence of the dioctyl sodium sulfosuccinate wetting agent.

The results of the tests were as summarized in Table III below:

TABLE III

| Fabric sample No. | Solution composition, percent | | Fabric pick-up, percent (a) | Estimated additive composition, percent (b) | | Breaking strength loss, percent (c) |
|---|---|---|---|---|---|---|
| | Fungicide | Wetting agent | | Fungicide | Wetting agent | |
| 1 | 10 | 0.1 | 11.1 | 11.0 | 0.1 | 4.3 |
| 2 (1) leached (d) | 10 | 0.1 | 9.9 | 9.8 | 0.1 | 0 |
| 3 | 6.6 | 0.07 | 6.6 | 6.5 | 0.07 | 0 |
| 4 (3) leached (d) | 6.6 | 0.07 | 6.4 | 6.3 | 0.07 | 0 |
| 5 | 5 | 0.05 | 5.9 | 5.8 | 0.06 | 0.4 |
| 6 (5) leached (d) | 5 | 0.05 | 3.4 | 3.3 | 0.05 | 0 |
| 7 | 3 | 3 | 2.8 | 1.4 | 1.4 | 0 |
| 8 (7) leached (d) | 3 | 3 | 1.5 | 0.75 | 0.75 | 0 |
| 9 | 3 | 0.3 | 2.2 | 2 | 0.2 | 0 |
| 10 (9) leached (d) | 3 | 0.3 | 1.6 | 1.4 | 0.2 | 0 |
| 11 | 1.5 | 0.15 | 1.5 | 1.4 | 0.1 | 0 |
| 12 (11) leached | 1.5 | 0.15 | 0.8 | 0.7 | 0.1 | 4.3 |
| 13 untreated control | | | | | | 68.0 | a. Measured weight percent of fungicide and wetting agent picked up by the fabric during treatment.
b. Proportions of fungicide and wetting agent picked up by fabric assumed to be approximately the same as those in the treatment solution.
c. Percentage loss in fabric breaking strength as a result of soil burial for 14 days.
d. Fabric sample treated with same treatment solution as shown in preceding entry and then leached with water for 24 hours before being subjected to soil burial.

As can be seen from the results summarized in Table III the use of di(2-octanone) thiocarbohydrazone results in the substantial elimination of breaking strength loss at fabric pick-up values as low as 0.7 percent by weight. Furthermore, the results show that water leaching does not significantly reduce the effectiveness of the treatment.

With respect to the use of heterocyclic ketones it may be noted that di-2-pyrrolidinone thiocarbohydrazone and di-2-acetylthiophene thiocarbohydrazone have been synthesized and subjected to the normal pure-culture, tube-dilution screening test. Both compounds were effective against both *A. niger* and *C. globosum* at 100 ppm. The former fungicide may be effective against *C. globosum* at 10 ppm. A first test indicates that it is effective and confirmatory work is being carried out. It seems clear that effectiveness at the 100 ppm level (particularly against *A. niger*) is adequate evidence that thiocarbohydrazones made from heterocyclic ketones are fungistatic.

We claim:

1. A method of treating a cellulosic article to inhibit attack by fungi which comprises applying to said article a compound of the formula

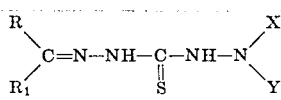

wherein each of R and $R_1$ is independently hydrogen, alkyl of up to 20 carbon atoms, phenyl, m-nitrophenyl, 2,4-dichlorophenyl, o-hydroxyphenyl, p-methoxyphenyl, o-chlorophenyl, o-dimethylaminophenyl, p-isopropylphenyl, 3,4-dimethylphenyl, piperidyl, m-dihydroxyphenyl, benzyl, styryl, furyl, or 2-thiofuryl, or R and $R_1$ taken together are tetramethylene or pentamethylene; and X and Y are both hydrogen or together represent =$CRR_1$, and a solid or liquid carrier, said compound being administered in an amount sufficient to inhibit the growth of said fungi.

2. A method of claim 1 wherein each of R and $R_1$ is independently alkyl of up to 20 carbon atoms, phenyl, m-nitrophenyl, 2,4-dichlorophenyl, o-hydroxyphenyl, p-methoxyphenyl, o-chlorophenyl, o-dimethylaminophenyl, isopropylphenyl, 3,4-dimethylphenyl or m-dihydroxyphenyl.

3. A method of claim 2, wherein said compound contains the group

derived from an aliphatic aldehyde of five to 12 carbon atoms, benzaldehyde, m-nitrobenzaldehyde, 2,4-dichlorobenzaldehyde, anisaldehyde, o-hydroxybenzaldehyde, o-chlorobenzaldehyde, o-dimethylaminobenzaldehyde, cumaldehyde, veratraldehyde, resorcylaldehyde, acetone, methyl ethyl ketone, 2-octanone or 2-heptadecanone.

4. A cellulosic article containing a fungicidally-effective amount of a compound of the formula

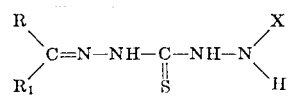

wherein each of R and $R_1$ is independently hydrogen, alkyl of up to 20 carbon atoms, phenyl, m-nitrophenyl, 2,4-dichlorophenyl, o-hydroxyphenyl, p-methoxyphenyl, o-chlorophenyl, o-dimethylaminophenyl, p-isopropylphenyl, 3,4-dimethylphenyl, piperidyl, m-dihydroxyphenyl, benzyl, styryl, furyl, or 2-thiofuryl, or R and $R_1$ taken together are tetramethylene or pentamethylene; and X and Y are both hydrogen or together represent =$CRR_1$, and a solid or liquid carrier, whereby the growth of fungi is retarded by the presence of said compound.

5. An cellulosic article of claim 4, wherein the proportion of said compound present in the cellulosic article is from 1 to 10 percent by weight, based on the weight of the untreated cellulosic article.

6. A cellulosic article of claim 4, wherein each of R and $R_1$ is independently alkyl of up to 20 carbon atoms.

7. A cellulosic article of claim 6 wherein said compound contains the group

derived from an aliphatic aldehyde of five to 12 carbon atoms, benzaldehyde, m-nitrobenzaldehyde, 2,4-dichlorobenzaldehyde, anisaldehyde, o-hydroxybenzaldehyde, o-chlorobenzaldehyde, o-dimethylaminobnzaldehyde, cumaldehyde, veratraldehyde, resorcyladldehyde, acetone, methyl ethyl ketone, 2-octanone or 2-heptadecanone.

* * * * *

UNITED STATES PATENT OFFICE
CERTIFICATE OF CORRECTION

Patent No. 3,734,757　　　　　　　　　Dated May 22, 1973

Inventor(s) DAVID M. WILES ET AL

It is certified that error appears in the above-identified patent and that said Letters Patent are hereby corrected as shown below:

Column 1, line 8, delete "produce" and insert --product--

Column 3, line 7, insert a comma (--,--) between "undecanal" and "dodecanal"

Column 6, line 34, second column of Table II, insert --3.0%-- line 35, third column of Table II, delete "zone" and insert therefor --no zone--

Column 8, 2nd line from bottom, change "resorcyladldehyde" to --resorcylaldehyde--

Signed and sealed this 9th day of April 1974.

(SEAL)
Attest:

EDWARD M. FLETCHER, JR.　　　　　　　C. MARSHALL DANN
Attesting Officer　　　　　　　　　　Commissioner of Patents